United States Patent [19]

Van Der Tol

[11] Patent Number: 5,418,867
[45] Date of Patent: May 23, 1995

[54] INTEGRATED OPTICAL DEVICE FOR MANIPULATING THE POLARIZATION OF OPTICAL SIGNALS

[75] Inventor: Maria Van Der Tol, Zoetermeer, Netherlands

[73] Assignee: Koninklijke PTT Nederland N.V., Groningen, Netherlands

[21] Appl. No.: 297,800

[22] Filed: Aug. 30, 1994

Related U.S. Application Data

[63] Continuation of Ser. No. 184,394, Jan. 19, 1994, abandoned.

[30] Foreign Application Priority Data

Feb. 2, 1993 [NL] Netherlands .......................... 9300204

[51] Int. Cl.$^6$ ................................................ G02B 6/26
[52] U.S. Cl. .......................................... 385/11; 385/28; 385/45
[58] Field of Search .................... 385/11, 14, 15, 27, 385/28, 39, 42, 43, 45, 46, 50

[56] References Cited

U.S. PATENT DOCUMENTS

| | | | |
|---|---|---|---|
| 4,846,540 | 7/1989 | Kapon | 385/45 |
| 4,998,793 | 3/1991 | Henry et al. | 385/1 |
| 5,048,909 | 9/1991 | Henry et al. | 385/27 |
| 5,056,883 | 10/1991 | Diemeer et al. | 385/8 |
| 5,111,517 | 5/1992 | Riviere | 385/11 |
| 5,133,029 | 7/1992 | Baran et al. | 385/11 |
| 5,185,828 | 2/1993 | van der Tol | 385/28 |
| 5,285,507 | 2/1994 | Van Der Tol | 385/11 |

FOREIGN PATENT DOCUMENTS

| | | |
|---|---|---|
| 0389172 | 9/1990 | European Pat. Off. . |
| 0444721 | 9/1991 | European Pat. Off. . |
| 0513919 | 11/1992 | European Pat. Off. . |
| 0522625A1 | 1/1993 | European Pat. Off. . |

OTHER PUBLICATIONS

J. J. G. M. Van Der Tol et al, "A Polarization Splitter on LiNbO$_3$ Using Only Titanium Diffusion", Jul. 1991, pp. 879–886, Journal of Lightwave Technology, No. 7, vol. 9.

J. J. G. M. Van Der Tol et al, "Measurement of Mode Splitting in Asymmetric Y-Junctions", May 1992, pp. 454–457, IEEE Photonics Technology Letters, No. 5, vol. 4.

K. Matsubara et al, "Y-Branch TE-TM Mode Splitter Using Multilayered Waveguide", May 1992, pp. 1636–1640, Japanese Journal of Applied Physics, Part 1, No. 5b, vol. 31.

P. Albrecht et al; TE/TM Mode Splitters on InGaAsP-/InP; Feb. 1990; pp. 114–115; 1990 IEEE, vol. 2, No. 2, Photonics Tech. Letters.

Birefringence Control and Dispersion Characteristics of Silicon Oxynitride Optical Waveguides; Dec. 1991; pp. 2317–2318; Electronics Letters, vol. 27, No. 25, J. Aarnio et al.

Y. Suzuki et al; Polarization Mode Selective Channel Wave-Guides in an InGaAs/InP Disordered Superlattice; Dec. 1990; pp. 2745–2747; App. Phys. Lett. 57 (26).

*Primary Examiner*—John D. Lee
*Attorney, Agent, or Firm*—Frishauf, Holtz, Goodman & Woodward

[57] ABSTRACT

An integrated optical, polarization-manipulating device, comprises a first waveguiding section (A) with a first guide (21), a second waveguiding section (E) with a second and a third optically decoupled and physically separated guide (28, 29) and an intermediary waveguiding section (C) for an adiabatic coupling between the first and the second sections (A, E). The intermediary section (C) comprises a polarization-sensitive asymmetric Y-branching device, provided with two mutually diverging intermediary guides (25, 27) coupled to the guides (28, 29) of the second section. At least one of the two intermediary guides (25) has a channel structure fragmented in the longitudinal direction. Coupling sections (B, D) for adiabatic couplings between guides of successive sections are provided, on the respective coupling sides, with the fragmented waveguide of a corresponding fragmented structure. The device can be provided on non-birefringent materials; is relatively simple to manufacture; and, in the case of the ridge-type guide structure, only one etching step is required.

9 Claims, 12 Drawing Sheets

INTEGRATED OPTICAL DEVICE FOR MANIPULATING THE POLARIZATION OF OPTICAL SIGNALS

This application is a Continuation of application Ser. No. 08/184,394, filed Jan. 19, 1994, (now abandoned).

A. BACKGROUND OF THE INVENTION

1. Field of the Invention

The invention is in the field of integrated optical devices. More in particular, it relates to integrated optical devices for manipulating the polarization of optical signals, in this case splitting, combining or filtering.

2. Prior Art integrated optical devices which deal with polarization, such as polarization splitters, are used, inter alia, in integrated embodiments of coherent optical receivers, in which detection takes place on the basis of polarization diversity. In a global sense, two kinds of integrated optical polarization splitters of this type are known. The one kind is based on interference, use being made, for the purpose of splitting two mutually orthogonal polarizations TE and TM of/in an optical signal, of the difference in phase between a fundamental and a first-order propagation mode of the polarizations. The other kind is based on the so-called "mode sorting effect". In this case, use is made of the difference in propagation preference of the polarizations for the two output channels, which differ from each other in terms of propagation constant, of an asymmetric Y-junction. The propagation preference is based on the fact that the asymmetry for the two polarizations differs in sign, which can be achieved by using birefringent materials. Thus, reference [1] discloses a polarization splitter on lithium niobate, with a waveguide structure, obtained by means of Ti diffusion therein, for the Y-junction, the opposite asymmetry being based on anisotropy in the increase of the refractive index as a result of the Ti diffusion. Reference [2] discloses a polarization splitter with a waveguide structure for the Y-junction on the basis of transparent polable polymer. In this case use is made of the fact that polable unpoled polymer is not birefringent, whereas poled polymer is, the poled state showing, with respect to the unpoled state, a refractive index difference which, for the two polarizations, differs in sign between one another.

Since at present it is customary, in optical communication systems, to choose a wavelength for the optical signal in the near infrared, an integrated optical receiver provided with a polarization splitter of this type can, given the current prior art, only be provided on the basis of semiconductor material such as indium phosphide (InP). A polarization splitter of the first type, implemented on InP, is disclosed, for example, by reference [3]. This known polarization splitter makes use of the polarization-dependent effect of a metal layer on the propagation of the guided modes in a directional coupling structure. Such a directional coupling structure provided with a metal layer, however, makes stringent demands on fabrication technology and presents additional complications during manufacture thereof. In a polarization splitter based thereon, the presence of the metal layer leads to unwanted additional attenuations of optical signals propagating therein. In a patent application not published at the time of filing, to wit reference [4], a polarization splitter is described which can be implemented very readily on InP and does not have the drawbacks mentioned of the polarization splitter disclosed by reference [3]. This known polarization splitter, which can be regarded as a kind of hybrid of the two kinds of polarization splitters indicated, consists of a mode converter having a periodic structure, in which one of the two polarizations is converted into a different order of guided mode, in combination with an asymmetrical Y-junction. Both the known polarization splitters which can be implemented on InP have the drawback, however, that they show a strongly wavelength-dependent behaviour.

The splitters of the above-indicated second kind have major advantages compared to those of the first kind. Namely, they are less wavelength-sensitive and require less stringent fabrication tolerances. Moreover, they show very low attenuation and very low optical-signal reflection in the input channel which is important, particularly in the case of coherent detection employing narrow-band lasers. As the material indium phosphide is not birefringent, an implementation of a polarization splitter corresponding to that in lithium niobate or that in polable polymer is not possible. It is, however, possible, in thin light-guiding layers of non-birefringent materials, to implement waveguides which have different propagation behaviour for the two polarizations and in which, therefore, birefringence occurs. Birefringence of this type is known under the names waveguide birefringence, geometric birefringence or shape birefringence. It is caused by waveguides being formed on the surface of a substrate. The polarization in which the dominant electric field component is perpendicular to the surface of the substrate, in this case the TM polarization, as a result experiences a different propagation than the polarization parallel to that surface, in this case the TE polarization. This effect can be influenced either, as disclosed by reference [5], by arranging a suitable layer above or below the waveguide in a planar waveguiding layer, or, as disclosed by reference [6], by arranging a composite layer structure ("superlattice"), in which case, by specific choice of the layer structure, channel-shaped waveguides are obtained which are selective for one of the two polarization modes. Reference [7] discloses polarization-manipulating 3-gate and 4-gate devices, including a polarization splitter of the second kind, in which shape birefringence of this type, based on a suitably chosen layer structure, is applied. A 3-gate device such as a polarization splitter comprises two waveguides having cores of different materials and with different effective refractive indices. In a transition section, between a first waveguiding section and a second waveguiding section, the cores overlap and one of the waveguide cores has an adiabatic taper. In the transition section, the two waveguides diverge adiabatically into physically separate and optically decoupled waveguides in the second waveguiding section. Integrated optical devices, in which shape birefringence of this type, based on a suitably chosen layer structure is applied, have the drawback, however, that their manufacture is rather laborious, not only owing to the number of necessary manufacturing steps, but also owing to the number of different materials to be used.

B. SUMMARY OF THE INVENTION

The object of the invention is to provide a structure for a polarization-manipulating device, more in particular a polarization-splitting device of the abovementioned second kind, which can be embodied on the basis of non-birefringent materials such as indium phosphide and does not have the abovementioned drawbacks. In contradistinction to the prior art, the invention makes use of the fact that the structural birefringence is achieved by influencing the polarization sensitivity, in contrast, in the lateral direction. To this end it employs a waveguide having a structure which, as it were, is fragmented in its longitudinal direction. An integrated optical device for manipulating the polarization of lightwave signals, comprising a substrate, and an optical-waveguiding thin layer supported by the substrate and provided with a first waveguiding section including a first channel-shaped waveguide, a second waveguiding section including a second channel-shaped waveguide and a third channel-shaped waveguide, in which second section the second and third waveguides are optically decoupled and physically separated, and an intermediary waveguiding section for an adiabatic coupling between the first and the second waveguiding sections, including an asymmetric Y branching device provided with two mutually diverging intermediary channel-shaped waveguides, coupled, respectively, with the second and the third waveguides of the second section, which intermediary waveguides have waveguide profiles having different propagation constants for each of the transverse polarization modes (TE, TM), the difference of the propagation constants of the two intermediary waveguides for the one polarization mode differing in sign from the difference of the propagation constants of the two intermediary waveguides for the other polarization mode, which is disclosed by reference [7], to this end according to the invention is characterized in that by at least one of the two intermediary channel-shaped waveguides has a geometrical structure which is fragmented in the longitudinal direction, which intermediary waveguide is hereinafter called fragmented waveguide, and in that the intermediary section further comprises a first coupling section for an adiabatic coupling of the first channel-shaped waveguide of the first waveguiding section with the intermediary waveguides, and a second coupling section for the adiabatic coupling of the fragmented waveguide with the second waveguide of the second waveguiding section, the coupling sections at the coupling sides in question with the fragmented waveguide having a corresponding fragmented geometric structure.

In a preferred embodiment, the invention is characterized in that the two intermediary waveguides are fragmented waveguides, of which the one is bimodal and the other monomodal, in that the channel-shaped waveguides of the first and second waveguiding section are monomodal, in that between the first channel-shaped waveguide and the first coupling section a first polarization-insensitive mode converter is incorporated for converting a zeroth-order guided mode into a first-order guided mode and vice versa, and in that between the second coupling section, by means of which the bimodal fragmented waveguide is coupled with one of the channel-shaped waveguides of the second waveguiding section, and one of the waveguides of the second waveguiding section a second polarization-insensitive mode converter is incorporated for converting a first-order guided mode into a zeroth-order guided mode and vice versa.

In a further preferred embodiment, all the waveguides forming part of the device are of the ridge type.

The optical device according to the invention has the following advantages:

the manufacture of the device does not require fabrication steps other than those required for the manufacture of channel-shaped waveguides on the integration material to be used;

there is good integrability with other devices;

when employing ridge-type waveguides, the manufacture of the whole device requires only one etching step;

by employing the "mode sorting effect" in asymmetrical Y-junctions the operation of the device is not critically dependent on the various parameters (such as angles, widths of the channel-shaped waveguides), so that the device has ample fabrication tolerances;

the device can be used in a wide wavelength range;

the device has low attenuation and reflection; and the device operates stably under varying operating conditions.

C. REFERENCES

[1] J. J. G. M. van der Tol and J. H. Laarhuis: "A polarization splitter on lithium niobate using titanium diffusion only", IEEE J. Lightw. Techn., Vol. 9, No. 7, July 1991, pp 879–886;

[2] EP-A-0444721;

[3] P. Albrecht, et al.: "TE/TM mode splitters on InGaAsP/InP", IEEE Phot. Techn. Lett., Vol. 2, No. 2, February 1990, pp. 114,115;

[4] European patent application no. 92201338.8 (by applicant; not yet published);

[5] J. Aarnio et al.: "Birefringence control and dispersion characteristics of silicon oxynitride optical waveguides", Electronics Letters, Vol. 27. No. 25, 5th Dec. 1991, pp. 2317, 2318;

[6] Y. Suzuki, et al.: "Polarization mode selective channel waveguides in an InGaAs/InP disordered superlattice", Appl. Phys. Lett., Vol. 57, No. 26, 24 Dec. 1990, pp. 2745–2747;

[7] EP-A-0389172;

[8] NL 9300204 (Dutch priority patent application of the present application).

All references are considered to be incorporated in the present application.

D. SHORT DESCRIPTION OF THE DRAWING

The invention will be explained below in more detail with reference to a drawing which comprises the following figures:

FIG. 1a shows, in diagrammatic form, a cross-sectional profile of two coupled waveguides of the ridge type;

FIG. 1b sketches, for the coupled waveguides shown in FIG. 1a, the variation of the propagation constants of each of the polarizations in the zeroth- and first-order guided mode as a function of the distance between the two coupled guides;

FIG. 2 shows, in diagrammatic form, a top view of a first embodiment of a polarization splitter according to the invention;

FIG. 3a to FIG. 3d inclusive show, successively, the polarization splitter in cross-section according to the lines, indicated in FIG. 2, 3a—3a to 3d—3d inclusive;

FIG. 4b shows the propagation course of a TE signal through the waveguide structure shown in FIG. 4a;

FIG. 4c shows the propagation course of a TM signal through the waveguide structure shown in FIG. 4a;

FIG. 5b shows the propagation course of a TE signal through the waveguide structure depicted in FIG. 5a;

FIG. 5c shows the propagation course of a TM signal through the waveguide structure depicted in FIG. 5a;

FIG. 6b shows the propagation course of a TE signal through the waveguide structure depicted in FIG. 6a;

FIG. 6c shows the propagation course of a TM signal through the waveguide structure depicted in FIG. 6a.

E. DESCRIPTION OF ILLUSTRATIVE EMBODIMENTS

Figure 1A:
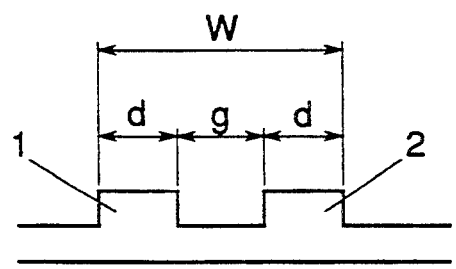

Use is made, in polarization-manipulating devices, for example a polarization splitter, which are based on the so-called "mode sorting effect", of difference in propagation preference of the polarizations for the two output channels, which differ from each other in their propagation constant, of an asymmetric Y-junction. Such a propagation preference is based on the fact that the asymmetry for the two polarizations differs in sign, which can be achieved by employing birefringence in at least one of the output channels. As is known, such birefringence can be achieved not only by selecting a birefringent material, but also by means of a special structure, in this case layer structure, of a number of suitably chosen non-birefringent materials for the waveguides. A birefringence of this type, due to the structure of a waveguide, is designated hereinafter as structural birefringence or waveguide birefringence. This occurs in the case of waveguides in thin layers, for example on the surface of a substrate. Light propagation in thin layers of this type is polarization-sensitive, in general. The polarization at which the dominant electric field component is perpendicular to the surface, i.e. the TM polarization, consequently experiences a different propagation than the polarization parallel to the surface, i.e. the TE polarization. The polarization sensitivity can, as is known and indicated in the above, be influenced by a special layer structure directly above (or below) the plane in which the light propagation proper takes place. This is possible because the evanescent field, that is to say the tails of the optical/electromagnetic field belonging to a guided mode of an optical signal propagating in the thin layer, runs on in the direction in which the dominant electric field component is standing. For the TM polarization, this direction is the normal, that is to say perpendicular to the substrate, while that for the TE polarization in contrast is the lateral direction. In the prior art, the intention therefore is, by suitable choice of a layer structure, to influence the polarization sensitivity in a direction perpendicular to the substrate, which obviously complicates the manufacture of optical devices based thereon. The invention makes use of a waveguide having a structure in which the polarization sensitivity, in contrast, is influenced in a lateral direction. This influencing effect is explained with reference to FIG. 1a and FIG. 1b. FIG. 1a depicts, in diagrammatic form, a cross-sectional profile of two coupled waveguiding channels such as, for example, in an optical directional coupler. For the sake of simplicity, for this purpose channel-shaped waveguides having ridge profiles 1 and 2 have been chosen, whose channel width is defined by the width of the ridges. The ridges each have a width d and are located at a mutual distance g, the total width being W. It should be noted that the length over which they are coupled is not relevant in this context. In such a system of coupled channels, the guided modes are system modes. In order to be able to compare the behaviour of the various propagation constants of these system modes as a function of said mutual distance g, the propagation constant is subjected to suitable normalization. The propagation constant $\beta_N$, thus normalized, for the polarization TX and the ith-order guided mode is defined as follows:

$$\beta_N(TX,i,g) = (-1)^i \{\beta(TX,i,g) - \beta_{ref}(TX)\} / \{\beta(TX,i,0) - \beta_{ref}(TX)\} \quad (1)$$

Figure 1B:
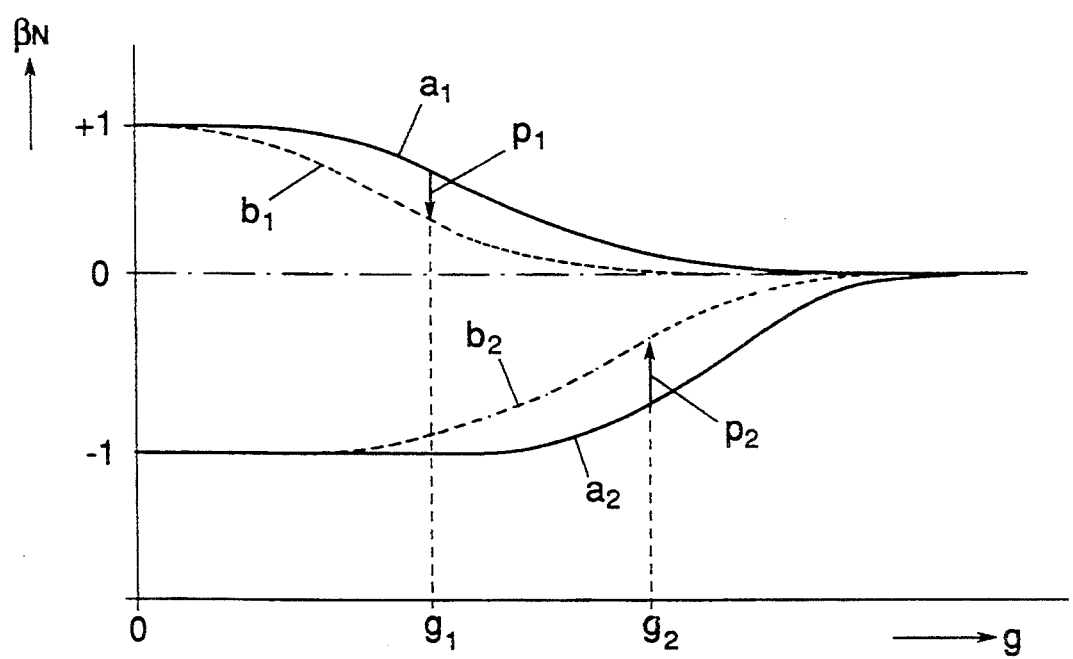

Here, $\beta(TX,i,g)$ is the propagation constant of the polarization TX (i.e. TE or TM) in the ith-order guided mode (i is the order number with i=0 for the zeroth or 1 for the first order) as a function of the mutual distance g, $\beta(TX,i,0)$ is the same propagation constant for g=0, and $\beta_{ref}(TX) = \beta(TX,i,g \to \infty)$, i.e. a reference value which is chosen to be equal to the propagation constant of the polarization TX for $g \to \infty$. The reference value is independent of the order number i of the mode. In FIG. 1b, the qualitative variation is sketched of the normalized propagation constant $\beta_N$ of each of the polarizations, both in the zeroth- and in the first-order guided mode, as a function of the mutual distance g between the ridges for a given (constant) ridge width. In the figure, the curves (full lines) $a_1$ and $a_2$ correspond to the normalized propagation constant $\beta_N$ for (TX=TE, i=0) and (TX=TE, i=1), respectively, while the curves (broken lines) $b_1$ and $b_2$ correspond to normalized propagation constant $\beta_N$ for (TX=TM, i=0) and (TX=TM, i=1) respectively. On the horizontal axis, values of the mutual distance g at which a maximum difference occurs between the normalized propagation constants of the TE and the TM polarizations are marked with $g_1$ and $g_2$, respectively, for the zeroth- and the first-order guided mode. The figure shows that for small values of g there is a large difference between the normalized propagation constants of the zeroth- and the first-order guided modes and that for increasing values of g all the normalized propagation constants become equal to the final value zero. In the last case, the non-normalized propagation constant $\beta$ attains the value which corresponds to the propagation constant of the mode which propagates in a single channel. The two channels are then actually decoupled.

At the same time, FIG. 1b shows that for increasing g the final value zero, i.e. the decoupling stage, is reached sooner for the TM polarization, both in the zeroth-order and in the first-order mode, than for the TE polarization. This suggests that the electro-magnetic field of a TM guided mode in the one channel stops feeling the presence of the other channel at smaller values for the spacing g than the field of a TE guided mode, which completely agrees with the difference, indicated hereinabove, in the tailing-off of the evanescent fields for the two polarizations. This implies that two single channels which run parallel next to one another can form a guide having a double structure, in which differences in propagation between the two polarizations occur but as a function of the mutual distance. It is indicated in the figure at what values for g the largest differences occur. For the zeroth-order guided mode this is at $g=g_1$, and for the first-order guided mode this is the case at $g=g_2$, a value greater than $g_1$, since the associated evanescent field decays less rapidly. Moreover, the difference is of opposite sign (see direction of the arrows $p_1$ and $p_2$). Such a variation of the normalized propagation constants, as depicted in FIG. 1b, is characteristic for each pair of coupled channel-shaped guides of any current type (e.g. "ridge" type, "buried" type, "strip loaded" type) on the surface of a substrate.

It has been found, more generally, that a number (two or more) of single channel structures, running parallel next to one another, of suitably chosen width and at a suitably chosen mutual distance, together may constitute a channel-shaped waveguide, thus with a multiple structure, in which the TE and TM polarizations of an optical signal propagate with different propagation constants, and in which birefringence therefore occurs. Depending on the total width W, such a guide may be a monomodal, a bimodal or a multimodal guide. Channel-shaped guides of this type, composed of a number of structures running parallel next to one another, are indicated as fragmented guides in the subsequent description. It has further been found that for increasing fragmentation, i.e. for an increasing number of single structures for a constant total width W of the fragmented guide, the birefringence is influenced more strongly.

The polarization-manipulating device according to the invention is based on an asymmetric Y-junction of which at least one of the branching channels is a fragmented guide having such dimensions that the normalized propagation constants of the two polarization modes of the same order $|\beta_N(TE,i,g)-\beta_N(TM,i,g)|$ for $i=0,1$ for the zeroth and the first order, respectively) differ in that guide, preferably maximally. This is achieved, for example, by selecting, for the single channel structures from which the fragmented guide is composed, a suitable mutual distance for a given width, as comparable to one of the situations indicated by the arrows p1 and p2 in FIG. 1b. It is then possible to choose, for the other branching channel, either a guide having a single channel structure, thus a non-fragmented guide, or a fragmented guide.

Hereinafter, examples will be described of both cases. Fragmented waveguides can in fact be implemented on the surface of a substrate on the basis of non-birefringent materials by means of any channel structure type (e.g. "ridge" type, "buried" type, "strip loaded" type) current in integrated optics. A "ridge" type channel structure is generally to be preferred, however, owing to the simplicity of its manufacture. Nevertheless it should be emphasized that the description hereinafter is restricted only by way of example to "ridge" type channel structures on the basis of indium phosphide (InP).

Figure 2:
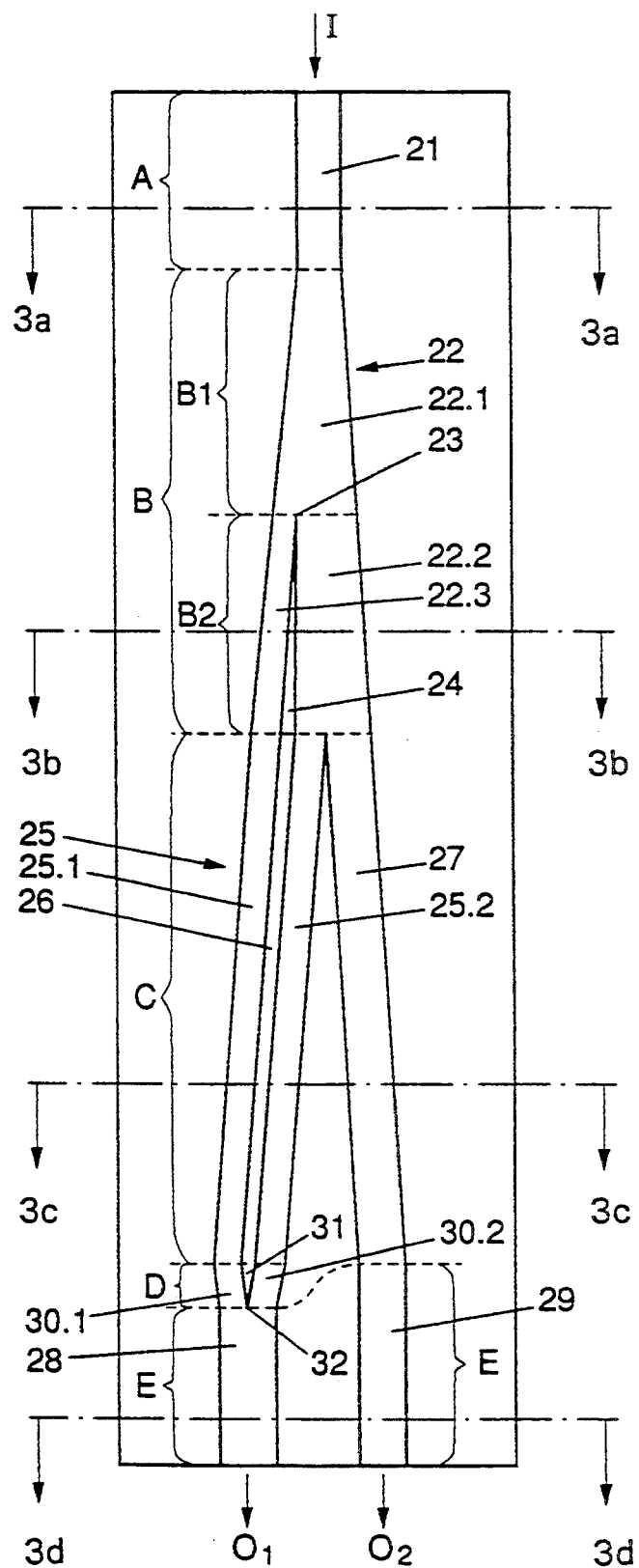
Figure 3A:
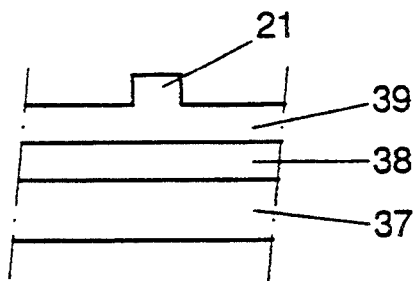
Figure 3B:
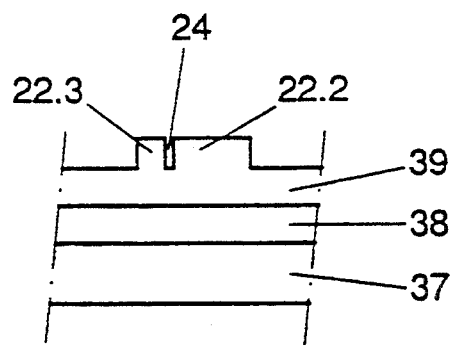
Figure 3C:
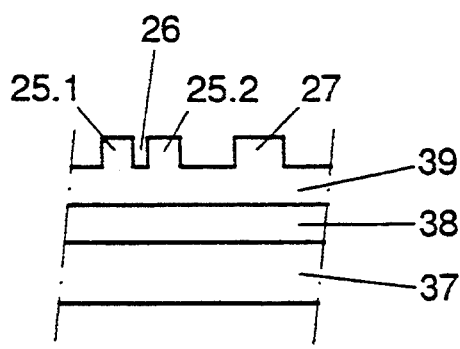
Figure 3D:
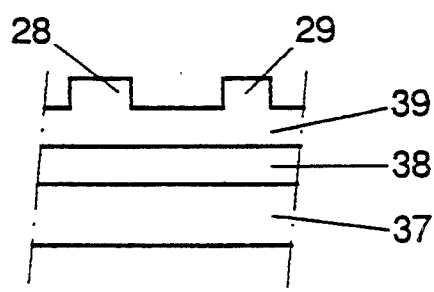

FIG. 2 depicts, in diagrammatic form, a top view of a waveguide pattern of a first embodiment of a polarization splitter according to the invention, while FIG. 3a to FIG. 3d, inclusive, successively show this pattern in cross-section according to the lines 3a—3a to 3d—3d inclusive indicated in FIG. 2. The waveguide pattern is embodied as a ridge-shaped pattern on a stack of layers comprising a substrate 31 of InP, a light-guiding layer 32 of InGaAsP and a top layer 33 of InP. The pattern is composed of adiabatically adjoining waveguiding sections A to E inclusive. Section A, the input section, comprises a single, non-fragmented monomodal input guide 21 for an incoming optical signal (arrow I). Section B, a first coupling section, comprises a tapered piece 22 for the adiabatic transition from a monomodal to a bimodal waveguiding structure, but at the same time from a non-fragmented to a fragmented structure. To this end, section B in fact consists of two directly adjoining subsections B1 and B2. In subsection B1, the tapered piece 22 consists of a single and gradually widening ridge 22.1. In subsection B2 the tapered piece 22 is split, from a point 23, into two ridges, a narrow ridge 22.2 and a wider ridge 22.3 with a gradually widening gap 24 in between these. The angle at which the tapered piece 22 widens in subsection B1 can be chosen to be equal to that in the subsection B2 as drawn, but is preferably larger. Section C, the polarization-splining section, comprises two diverging waveguides, a fragmented waveguide 25 with two ridges 25.1 and 25.2 running parallel with a gap 26 therebetween, and a non-fragmented waveguide 27. In this arrangement, the waveguides 25 and 27 diverge as far as complete decoupling and the gap 24 merges into gap 26. Section E, the output section, comprises two single/non-fragmented output guides 28 and 29, respectively, for outgoing optical signals (arrows O1 and O2). Section D, a second coupling section, comprises a tapered piece 30 for the adiabatic junction from the fragmented waveguiding structure of the waveguide 25 to the monomodal non-fragmented waveguiding structure of the waveguide 28. To this end, the tapered piece 30 consists of two converging ridges 30.1 and 30.2 with a gap 31 narrowing to zero therebetween, which ends in a point 32 on the junction of section D into section E. The waveguide 27 merges into waveguide 29.

The guides 25 and 27 are dimensioned as follows. For the fragmented guide 25, given a suitable ridge width for the ridges 25.1 and 25.2, the width of the gap 26 between the ridges is chosen in such a way that it corresponds as far as possible to the situation indicated in FIG. 1a by arrow $p_1$ ($g=g_1$); for the single guide 27 a ridge width has then been chosen in such a way that the following holds good:

$$\beta_{25}(TM,0,g_1)<\beta_{27}(TM,0,0) \text{ and}$$
$$\beta_{27}(TE,0,0)<\beta_{25}(TE,0,g_1) \qquad (2)$$

where $\beta_{25}(TX,0,g_1)$ and $\beta_{27}(TX,0,0)$, respectively, represent the propagation constants for the polarization TX (TE or TM) of the guides 25 and 26 in accordance with the notation introduced hereinabove.

The polarization splitter having a waveguide pattern according to FIG. 2 works as follows: a zeroth-order guided mode of the TE polarization, i.e. a $TE_{00}$ signal coming in (according to arrow I) via the input guide 21 will reach, via the adiabatic transition in tapered piece 22, unaffected the split in the junction to section C. There the $TE_{00}$ signal selects the channel having the highest propagation constant for that guided mode, which, according to relationship (2) is the guide 25. From there it will propagate further, unaffected, via the adiabatic transition of the tapered piece of section D and the output guide 28 of section E in the direction of arrow O1. A zeroth-order guided mode of the TM polarization, likewise propagating via the input guide and the tapered piece 22, will also, having arrived at the split in the junction from section B to C, propagate further via the channel having the highest propagation constant for that guided mode. Now however, this channel, again according to the relationship (2), is the single guide 27. Therefore, the signal (arrow I) coming in via the monomodal input guide 21 and having an unknown polarization, in general containing a $TE_{00}$ component and a $TM_{00}$ component of arbitrary relative strength and an arbitrary relative phase, will be split into a signal (arrow O1), going out via guide 28 and containing (virtually) exclusively the $TE_{00}$ component and a signal (arrow O2), going out via guide 29 and containing (virtually) exclusively the $TM_{00}$ component.

EXAMPLE 1

Figure 4A:
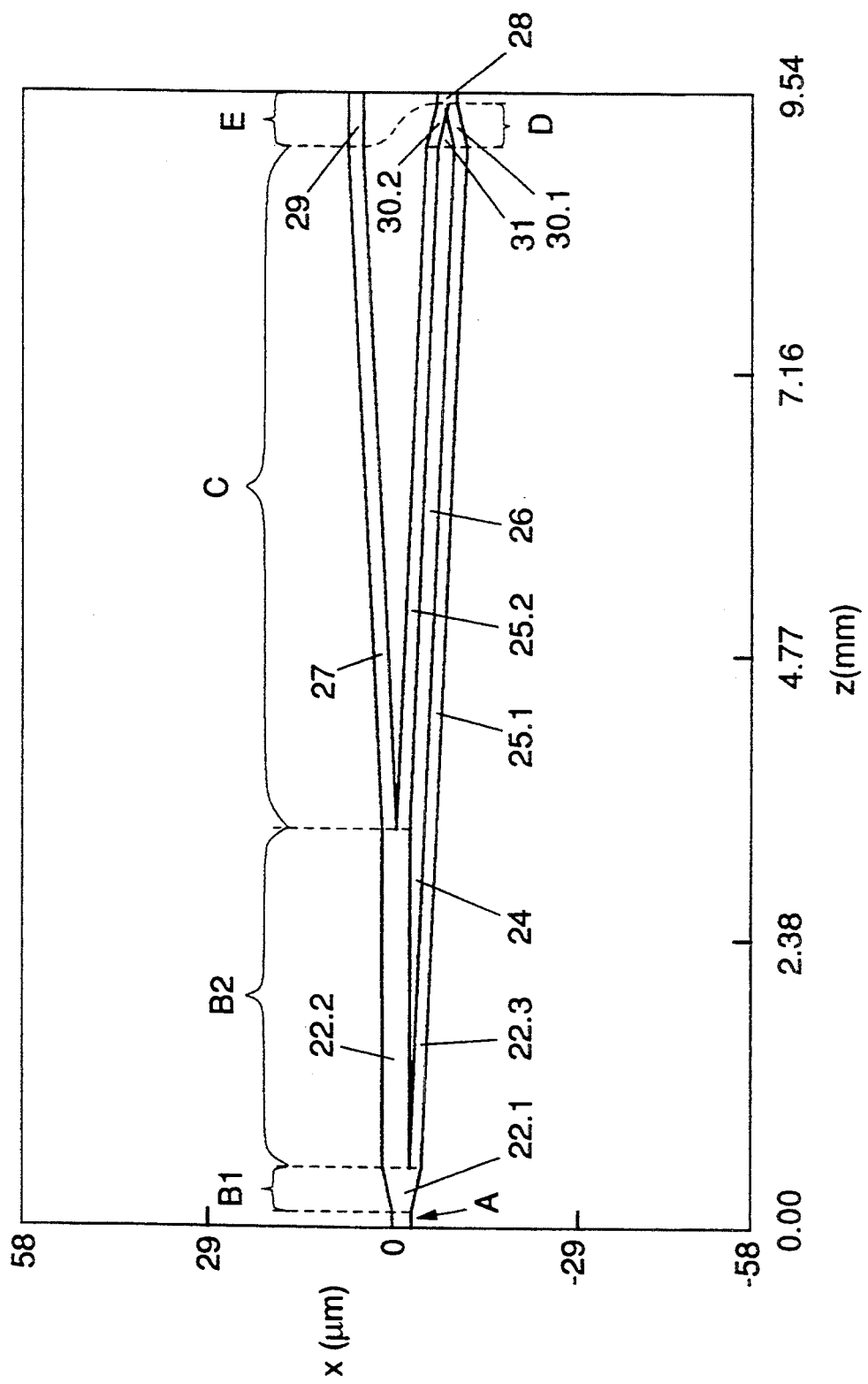
FIG. 4a shows, to scale, a top view of a waveguide structure of a polarization splitter in accordance with that of FIG. 2.

FIG. 4a depicts a top view, to scale, of a structure described with reference to FIG. 2 and FIG. 3a to 3d, inclusive. The length of the structure is depicted in mm along a z-axis, while the width of the structure is depicted in μm along an x-axis. The various waveguiding sections are correspondingly designated by the letters A to E, inclusive. The polarization-splitting behaviour of this structure has been simulated with the aid of a simulation method generally known under the name beam propagation method. The following data were used for this simulation:

wavelength of the optical signal: 1.5 μm
refractive indices: InP: 3.1754, and InGaAsP: 3.4116
thickness of the light-guiding layer 38 (InGaAsP): 460 nm
thickness of the top layer 39 (InP): 250 nm
ridge height above the top layer: 250 nm
Section A: length: 100 μm, width of the ridge 21: 3.1 μm;
Subsection B1: length: 372 μm, width of the ridge 22.1: increasing from 3.1 μm to 6.35 μm;
Subsection B2: length: 2865 μm, increasing in width from 6.35 μm to a total of 8.85 μm; width of narrow ridge 22.3: 2.0 μm; width of ridge 22.2: 4.35 μm; width of gap 24: increasing from 0 to 2.5 μm;
Section C: length: 5730 μm increasing in width from 8.85 μm to 14.85 μm; width of the ridges 25.1 and 25.2: 2.0 μm; width of the gap 26: 2.5 μm; width of the ridge 27: 2.35 μm; distance between the ridges 25.2 and 27 increasing to 10.0 μm;
Section D: length: 390 μm decreasing in width from 6.5 μm to 3.1 μm, the width of the gap 31 already having been reduced to 0 μm at 286 μm; width of the ridges 30.1 and 30.2: 2.0 μm;
Section E: width of the ridge 28: 3.1 μm; and of the ridge 29: 2.35 μm.

Figure 4B:
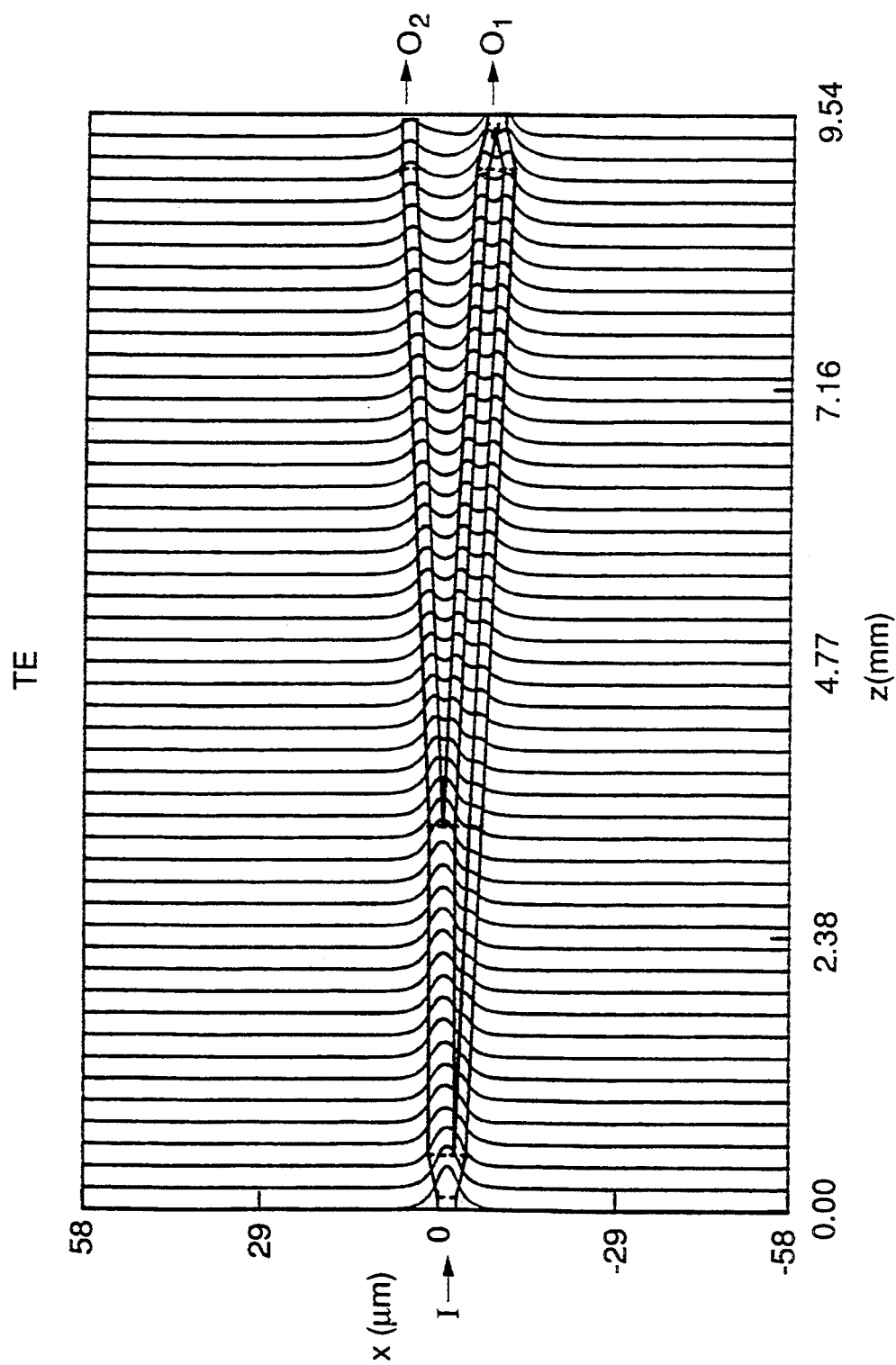

FIG. 4b depicts the course of propagation in the case where the optical signal (arrow I) entering section A is a signal which exclusively contains the TE polarization. Result: 81.5% of the TE signal exits according to the arrow O1 and 17% according to the arrow O2; loss: −0.07 dB and suppression: −7.6 dB.

Figure 4C:
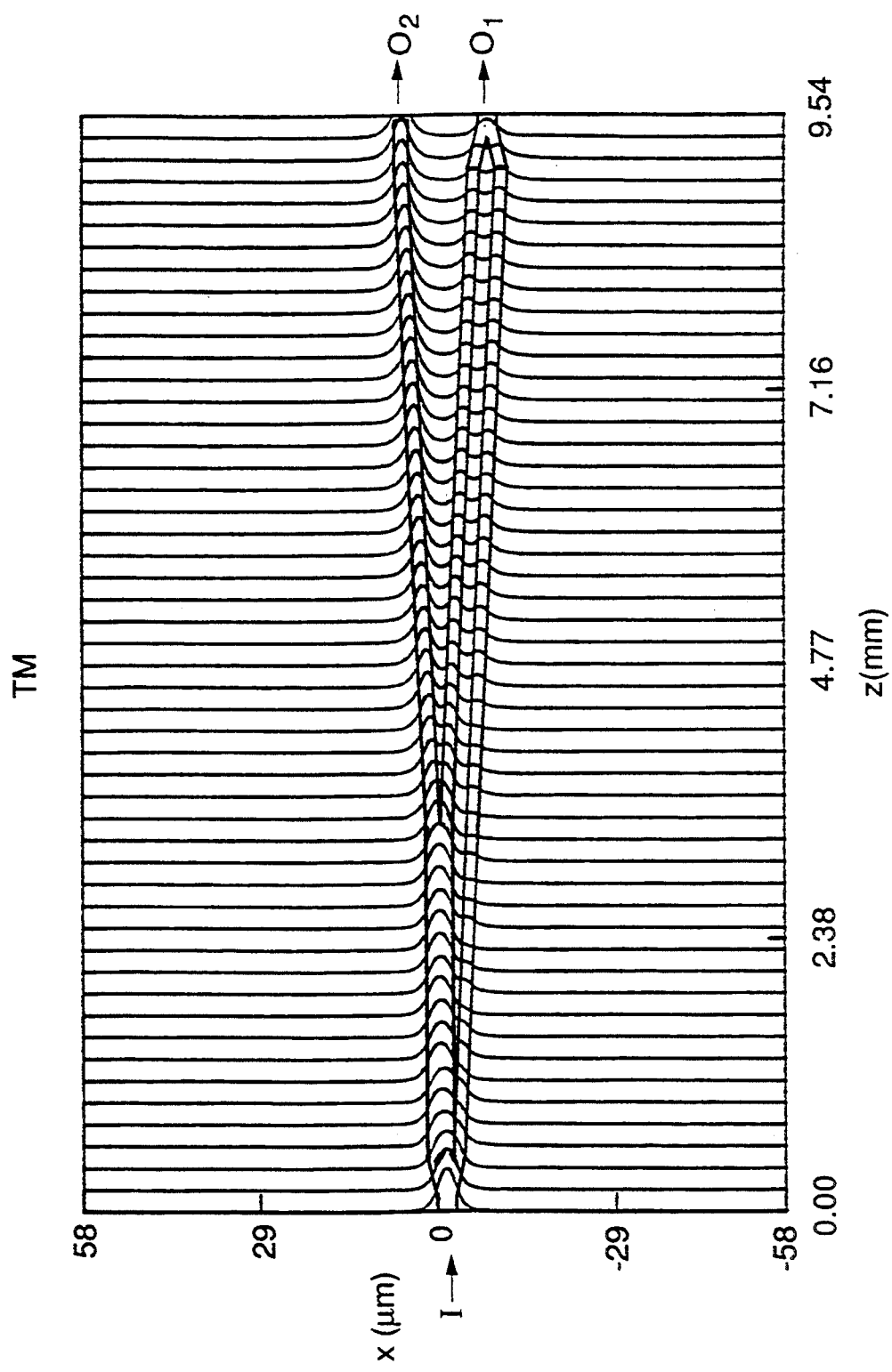

FIG. 4c depicts a similar result in the case where the incoming signal (arrow I) exclusively contains the TM polarization. Result: 82.5% of the TM signal exits according to the arrow O2 and 17% according to the arrow O1; loss: −0.02 dB and suppression: −7.6 dB.

EXAMPLE 2

FIG. 5a again depicts, to scale, the top view of a structure described with reference to FIG. 2 and FIG. 3a to 3d, inclusive, in which now, however, the section C comprises a fragmented guide which is formed by three parallel ridges 25.3, 25.4 and 25.5 having equal width with gaps 26.1 and 26.2 therebetween of equal width. Here, sections B and D are fragmented accordingly. The subsection B2 is now formed by two narrow ridges 22.5 and 22.6 of equal width and a wider ridge 22.4 with gaps 24.1 and 24.2 therebetween. The section D is formed by three converging ridges 30.3, 30.4 and 30.5 with gaps 31.1 and 31.2 narrowing to zero therebetween. The length of the structure is depicted in mm along a z-axis, while the width of the structure is depicted in μm along an x-axis. The polarization-splitting behaviour of this structure was also simulated. In this simulation, the following data were used for the sections:

Section A: length: 100 μm; width of the ridge 21: 3.1 μm;
Subsection B1: length: 206 μm; width of the ridge 22.1: increasing from 3.1 μm to 8.5 μm;
Subsection B2: length: 2865 μm, increasing in width from 8.5 μm to a total of 13.5 μm; width of the narrow ridges 22.5 and 22.6: 2.0 μm; width of ridge 22.4: 4.5 μm; width of the gaps 24.1 and 24.2: increasing from 0 to 2.5 μm;
Section C: length: 4011 μm increasing in width from 13.5 μm to 20.5 μm; width of the ridges 25.3, 25.4 and 25.5: 2.0 μm; width of the gaps 26.1 and 26.2: 2.5 μm; width of the ridge 27: 2.5 μm; distance between the ridges 25.5 and 27 increasing to 7.0 μm;
Section D: length: 611 μm decreasing in width from 11.0 μm to 3.1 μm, the width of the gaps 31.1 and 31.2 having already been reduced to 0 μm at 463 μm; width of the ridges 30.3, 30.4 and 30.5: 2.0 μm;
Section E: width of the ridge 28: 3.1 μm; and of the ridge 29: 2.5 μm.

Figure 5A:
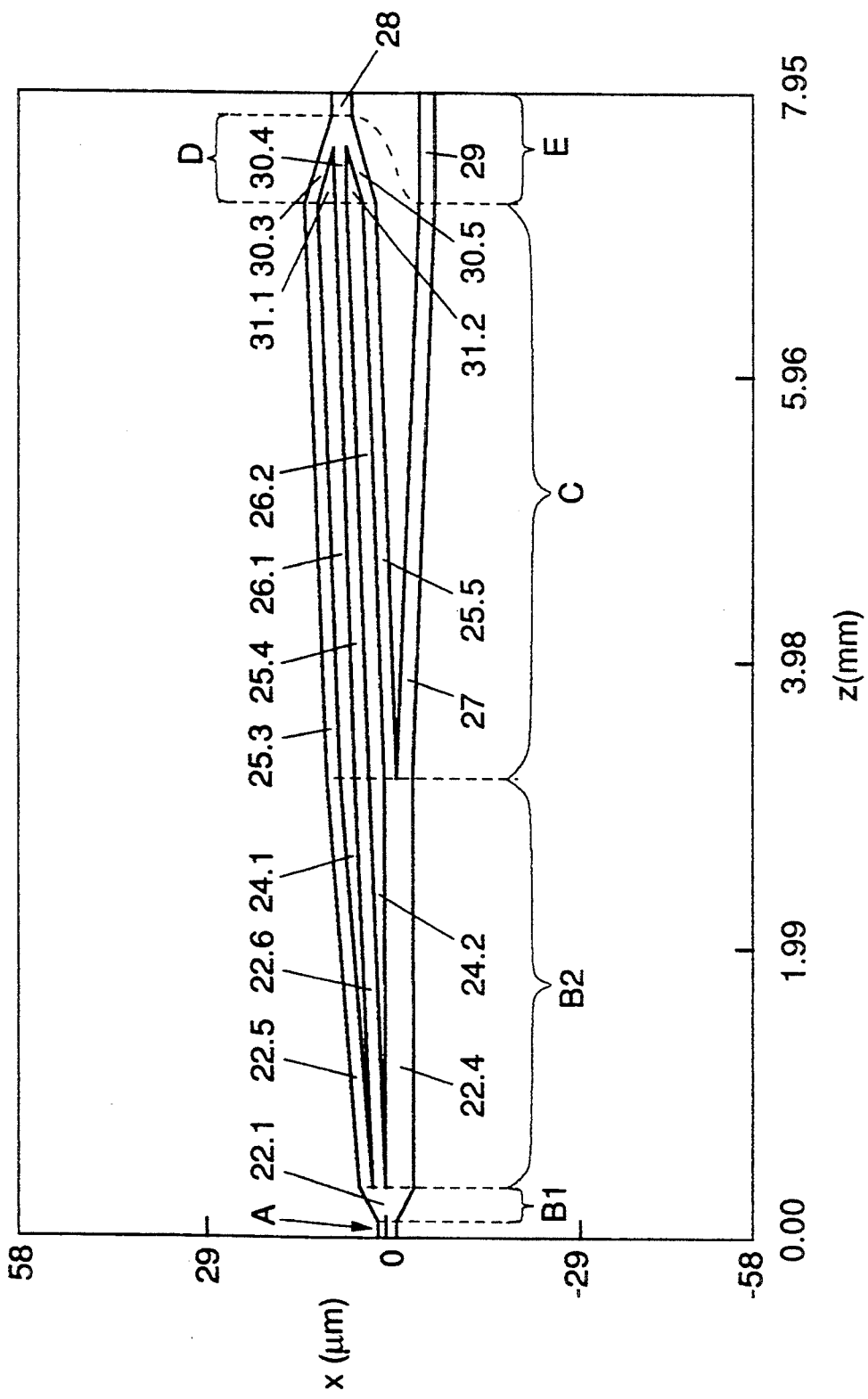
FIG. 5a shows, to scale, a top view of a waveguide structure of a polarization splitter which is a variation of that shown in FIG. 2.
Figure 5B:
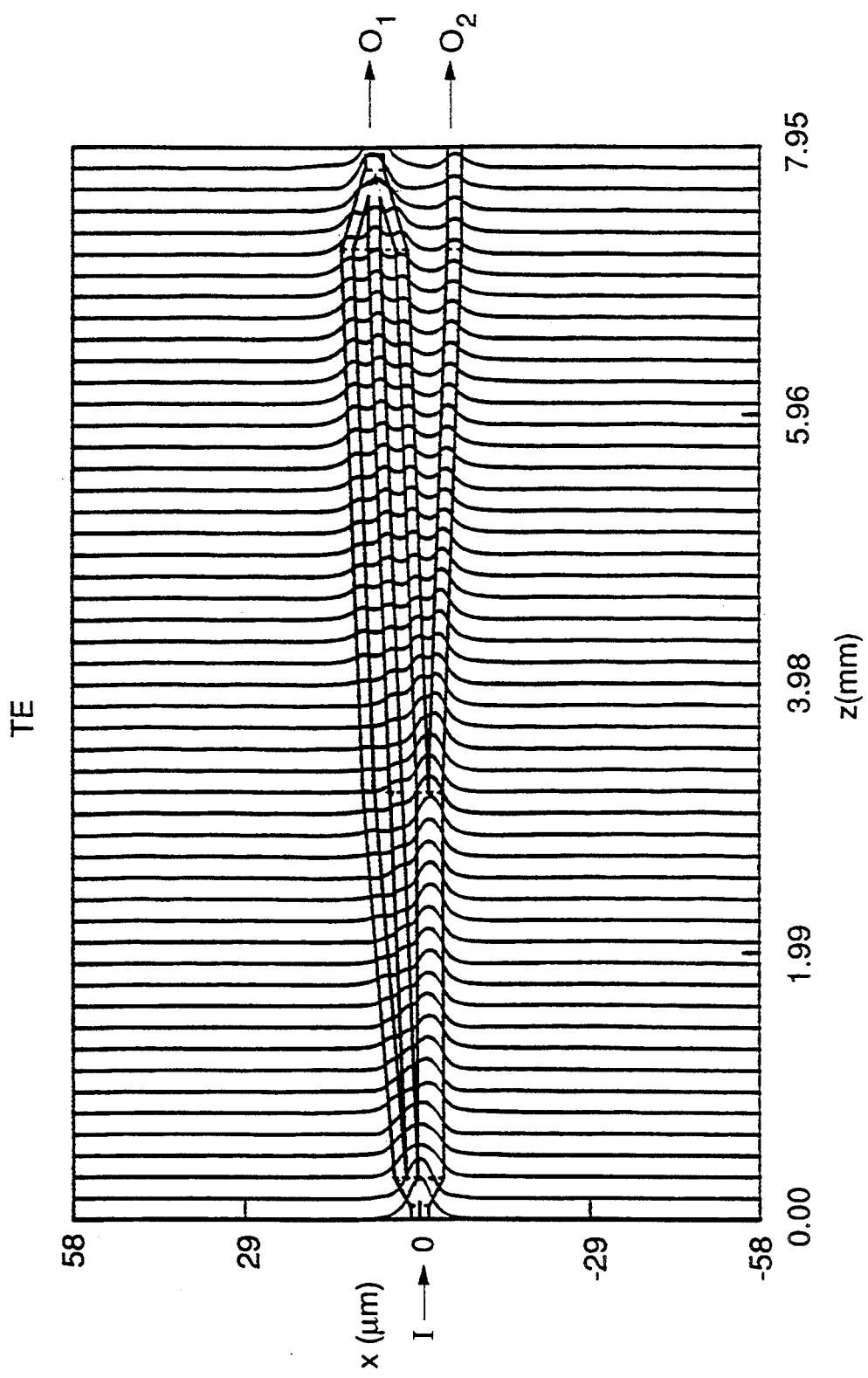

FIG. 5b depicts the simulation result of the signal propagation in a structure according to FIG. 5a in the case where the optical signal (arrow I) entering section A is a signal which exclusively contains the TE polarization. Result: 87% of the TE signal exits according to the arrow O1 and 10.5% according to the arrow O2; loss: −0.11 dB and suppression: −9.7 dB.

Figure 5C:
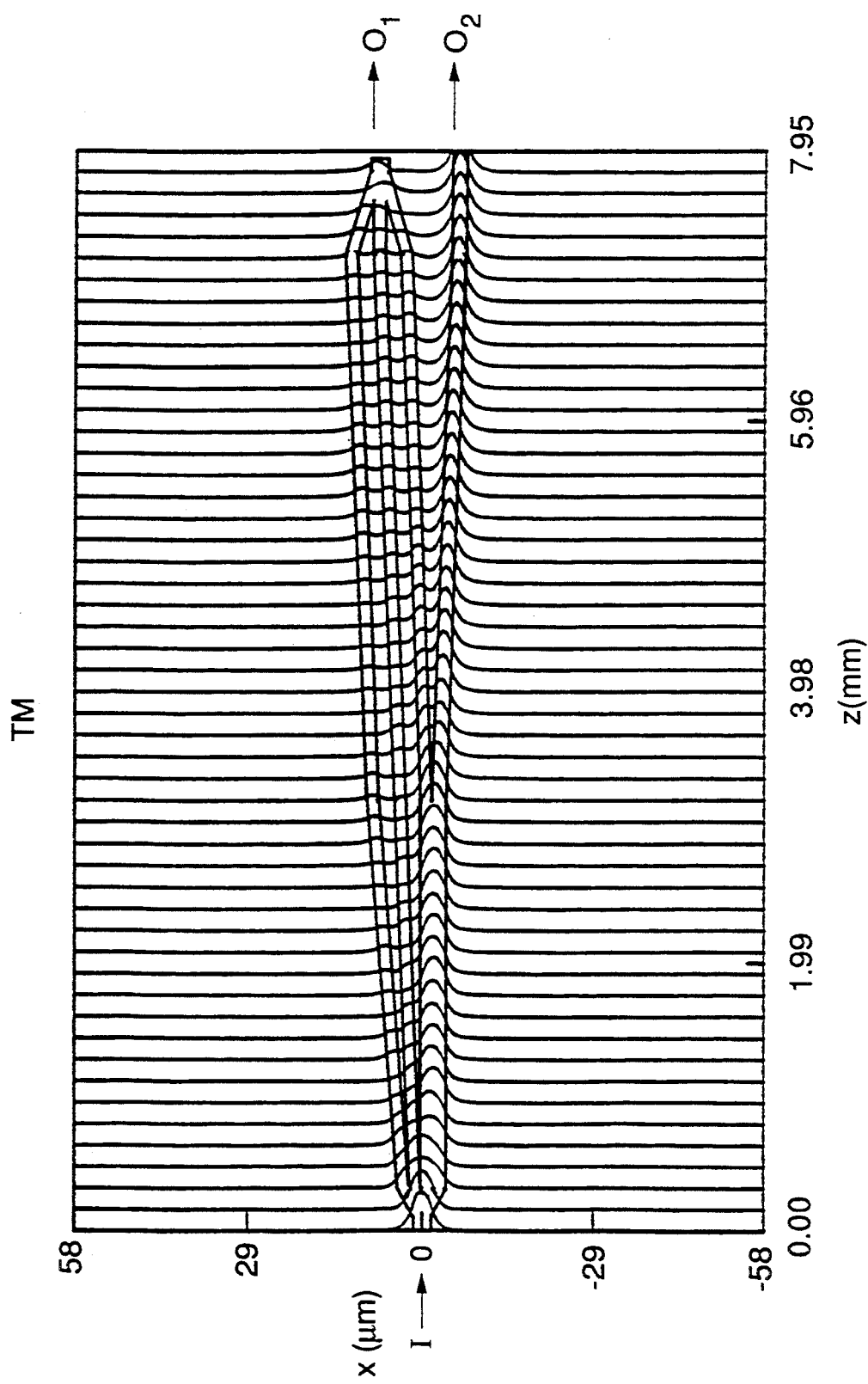

FIG. 5c depicts a similar result in the case where the incoming signal (arrow I) exclusively contains the TM polarizations. Result: 92% of the TM signal exits according to the arrow O2 and 6% according to the arrow O1; loss: −0.09 dB and suppression: −12.1 dB.

The examples 1 and 2 show that asymmetric Y-junctions of which one of the branching outgoing channels is a fragmented guide and the other channel is a single guide, exhibit a polarization-splitting effect, and that this effect increases with increasing fragmentation. However, the suppression is still too low. Optimization of the dimensioning of the waveguide patterns will surely be able to lead to better results.

A structurally better result can, however, be achieved by designing both branching channels so that they are fragmented, the one channel being monomodal and the other bimodal for both polarizations. In this case, the signal presented at the start of the asymmetric branching device is no longer of zeroth-order guided mode, but of first-order guided mode. By itself, an asymmetric branching device of this type is not directly usable as a polarization splitter, since optical signals are presented and accepted as zeroth-order guided modes. To this end, it must be possible for the suitable mode conversions to take place in the input and output sections.

Figure 6A:
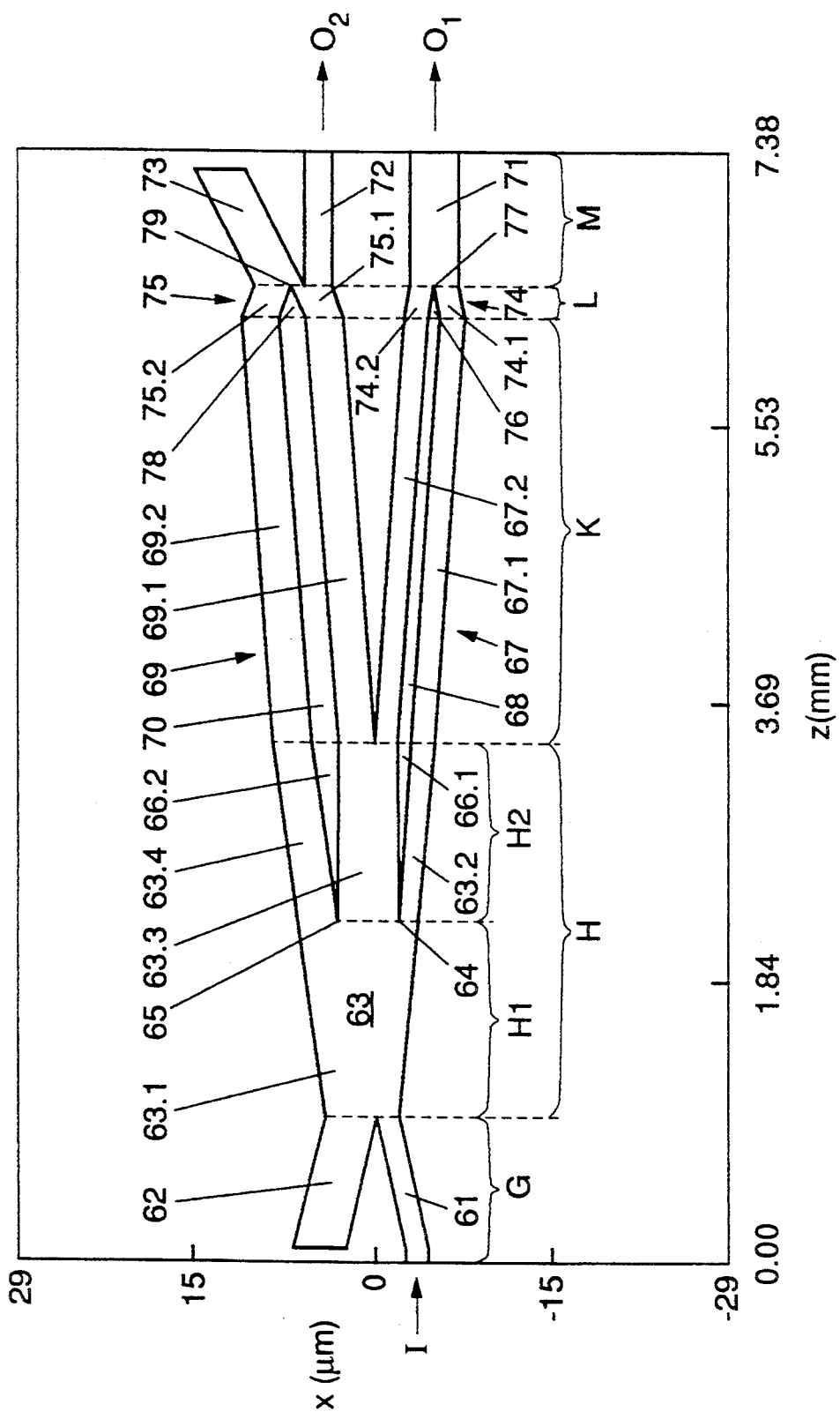
FIG. 6a shows, in diagrammatic form and to scale, a top view of a second embodiment of the polarization splitter according to the invention.

In FIG. 6a, in top view and diagrammatically, a waveguide pattern is depicted of a polarization splitter based on an asymmetric branching device, in which both branching channels are of fragmented design. The waveguide pattern is again implemented as a ridge-shaped pattern in a manner similar to that depicted in FIG. 3a to 3d inclusive, and is therefore not specified in detail for the waveguide pattern of FIG. 6a. The waveguide pattern is composed of adiabatically adjoining waveguiding sections G, H, K, L and M, i.e. an input section G, a first coupling section H, a polarization-splitting section K, a second coupling section L and an output section M. The input section G comprises a mode converter, formed by an asymmetric Y-junction with two single guides 61 and 62 which are both monomodal for both polarizations TE and TM, which guides converge from outside the region where they may be regarded as being decoupled, to a bimodal trunk at the input of the coupling section H. In this arrangement, the guide 62 for both polarizations has a somewhat greater propagation constant, for example as in the figure, owing to a somewhat greater width than that of the guide 61, and the guide 61 forms the input guide proper for an incoming optical signal (arrow I), while the guide 62 is a dummy guide. The coupling section H comprises a tapered piece 63 for the adiabatic transition from a non-fragmented, bimodal guide to a fragmented structure at the input of the polarization-splining section K. To this end, section H in fact consists of two directly adjoining subsections H1 and H2. In the subsection H1, the tapered piece 63 consists of a single and gradually widening ridge 63.1. In the subsection H2, the tapered piece 63 is split, from points 64 and 65, into three ridges 63.2, 63.3 and 63.4, with gradually widening gaps 66.1 and 66.2 therebetween. The angle at which the tapered piece 63 widens in subsection H1 can be chosen to be equal to that in subsection H2, as drawn, but is preferably greater. The polarization-splitting section K comprises two diverging waveguides, a first fragmented monomodal waveguide 67 with two ridges 67.1 and 67.2, running parallel, with a gap 68 in between, and a second fragmented bimodal waveguide 69 with two ridges 69.1 and 69.2 running parallel with a gap 70 in between. In this arrangement, the waveguides 67 and 69 diverge as far as complete decoupling and the gaps 66.1 and 66.2 merge, respectively, into the gaps 68 and 70. The output section M comprises two single (i.e. unfragmented) monomodal output guides 71 and 72, respectively, for outgoing optical signals (arrows O1 and O2). The output guide 72 and a further monomodal guide 73 together form the diverging branches of an asymmetric Y-junction with a bimodal trunk, which functions as a mode converter. In this arrangement, the guide 73 has a somewhat greater propagation constant for both polarizations, for example as in the figure, owing to a somewhat greater width, than that of the guide 72. The guide 73 is a dummy guide which terminates at a distance from the guide 72, where the guides 72 and 73 can be regarded as decoupled. The coupling section L comprises a tapered piece 74 for the adiabatic transition from the fragmented waveguiding structure of the waveguide 67 to the monomodal non-fragmented waveguiding structure of the waveguide 71, and a tapered piece 75 for the adiabatic transition from the fragmented waveguiding structure of the waveguide 69 to a non-fragmented bimodal structure of the trunk of the asymmetric Y-junction in the output section M. The tapered piece 74 consists of two converging ridges 74.1 and 74.2 with a gap 76 narrowing to zero therebetween, which terminates in a point 77 on the junction from section L into section M. The tapered piece 75 consists of two converging ridges 75.1 and 75.2 with a gap 78 narrowing to zero therebetween, which terminates in a point 79 on the junction from section L into section M. It should be noted that in this embodiment the length of the bimodal trunk of the asymmetric Y-junctions in the input and output sections in both cases is chosen to be zero.

When dimensioning the fragmented guides for the monomodal guide 67, given a suitable ridge width for the ridges 67.1 and 67.2, the width of the gap 68 between the ridges was chosen to be such that it corresponds to the situation indicated in FIG. 1a by arrow $p_1$ ($g=g_1$); then, for the bimodal guide 69, based on a width of the gap 70 which corresponds to the situation, indicated by arrow $p_2$ ($g=g_2$), for the chosen width for the ridges 67.1 and 67.2, a greater ridge width was chosen in such a way that the relationships (3.1) and (3.2) held good for the propagation constants of the guides 67 and 69:

$$\beta_{67}(TM,0,g_1) < \beta_{69}(TM,1,g_2) < \beta_{69}(TM,0,g_2) \qquad (3.1)$$

and $$\beta_{69}(TE,1,g_2) < \beta_{67}(TE,0,g_1) < \beta_{69}(TE,0,g_2) \qquad (3.2)$$

The polarization splitter having a waveguide pattern in accordance with FIG. 6a works as follows: a zeroth-order guided mode of the TE polarization, i.e. a $TE_{00}$ signal coming in (according to arrow I) via the input guide 61 will, owing to the proximity of the dummy guide 62, be converted into a first-order guided mode of the same polarization, i.e. a $TE_{01}$ signal and further propagate as such and, via the adiabatic transition in tapered piece 63, reach the split in the transition from section H to section K without being perturbed. There the $TE_{01}$ signal selects the channel having the highest propagation constant but one for that polarization which, according to relationship (3.2) is the guide 67. Since the guide 67 is monomodal, the signal will propagate further as a $TE_{00}$ signal via the guide 67 and then via the adiabatic transition from the tapered piece 74 of the coupling section L and the output guide 71 of the output section M in the direction of arrow O1. A zeroth-order guided mode of the TM polarization, a $TM_{00}$ signal, also propagating via the input guide 61, will likewise first be converted into a first-order guided mode, a $TM_{01}$ signal and as such propagating further via the tapered piece 63, will, having arrived at the split in the junction from the section H to K, propagate further via the channel having the highest propagation constant but one for that polarization. That channel now, however, according to relationship (3.1) is the bimodal guide 69. Therefore the $TM_{01}$ signal will propagate further as a first-order guided mode via the guide 69 and the tapered piece 75 of the coupling section L. At the branching guides 72 and 73 of the asymmetric Y-junction in the output section M a first-order mode signal propagates further in the channel having the lowest propagation constant, in this case the monomodal guide 72, being converted into a zeroth-order guided mode signal.

Therefore, the signal (arrow I) coming in via the monomodal input guide 61 and having an unknown polarization, in general containing a $TE_{00}$ component and a $TM_{00}$ component of arbitrary relative strength and an arbitrary relative phase, will be split into a signal (arrow O1), going out via guide 71 and containing (virtually) exclusively the $TE_{00}$ component and a signal (arrow O2), going out via guide 72 and containing (virtually) exclusively the $TM_{00}$ component.

EXAMPLE 3

In FIG. 6a the structure described hereinabove has already been depicted to scale. The length of the structure is depicted in mm along a z-axis, while the width of the structure is depicted along an x-axis in μm. The polarization-splitting behaviour of this structure has again been simulated. In this simulation the following data were used:

wavelength of the optical signal: 1.5 μm
refractive indices: InP: 3.1754, and InGaAsP: 3.4116
thickness of the light-guiding layer 38 (InGaAsP): 473 nm
thickness of the top layer 39 (InP): 190 nm
ridge height above the top layer: 200 nm
Section G: length: 873 μm; width of the ridge 61: 2.0 μm; width of the ridge 62: 4.0; the approach angle between the ridges 61 and 62: 5.7 mrad;
Subsection H1: length: 1070 μm; width of the ridge 63.1: increasing from 6.0 μm to 9.0 μm;
Subsection H2: length: 1430 μm, increasing in width from 9.0 μm to a total of 13.0 μm; width of ridge 63.2: 2.0 μm; width of the ridge 63.3: 4.0 μm; width of the ridge 63.4: 3.0 μm; width of the gap 66.1: increasing from 0 to 1.0 μm; width of the gap 66.2: increasing from 0 to 2.0 μm;
Section K: length: 2865 μm increasing in width from 13.0 μm to 18.0 μm; width of the ridges 67.1 and 67.2: 2.0 μm; width of the gap 68: 1.0 μm; width of the ridges 69.1 and 69.2: 3.0 μm: width of the gap 70: 2.0 μm; distance between the ridges 67.2 and 69.2: increasing from 0 to 5.0 μm;
Section L: length of the tapered pieces 74 and 75: 212 μm, tapered piece 74 decreasing in width from 5.0 μm to 4.0 μm, and tapered piece 75 from 8.0 μm to 6.0 μm; width of the ridges 74.1 and 74.2: 2.0 μm; width of the ridges 75.1 and 75.2: 3.0 μm;
Section M: width of the ridges 71 and 73: 4.0 μm; and of the ridge 72: 2.0 μm.

Figure 6B:
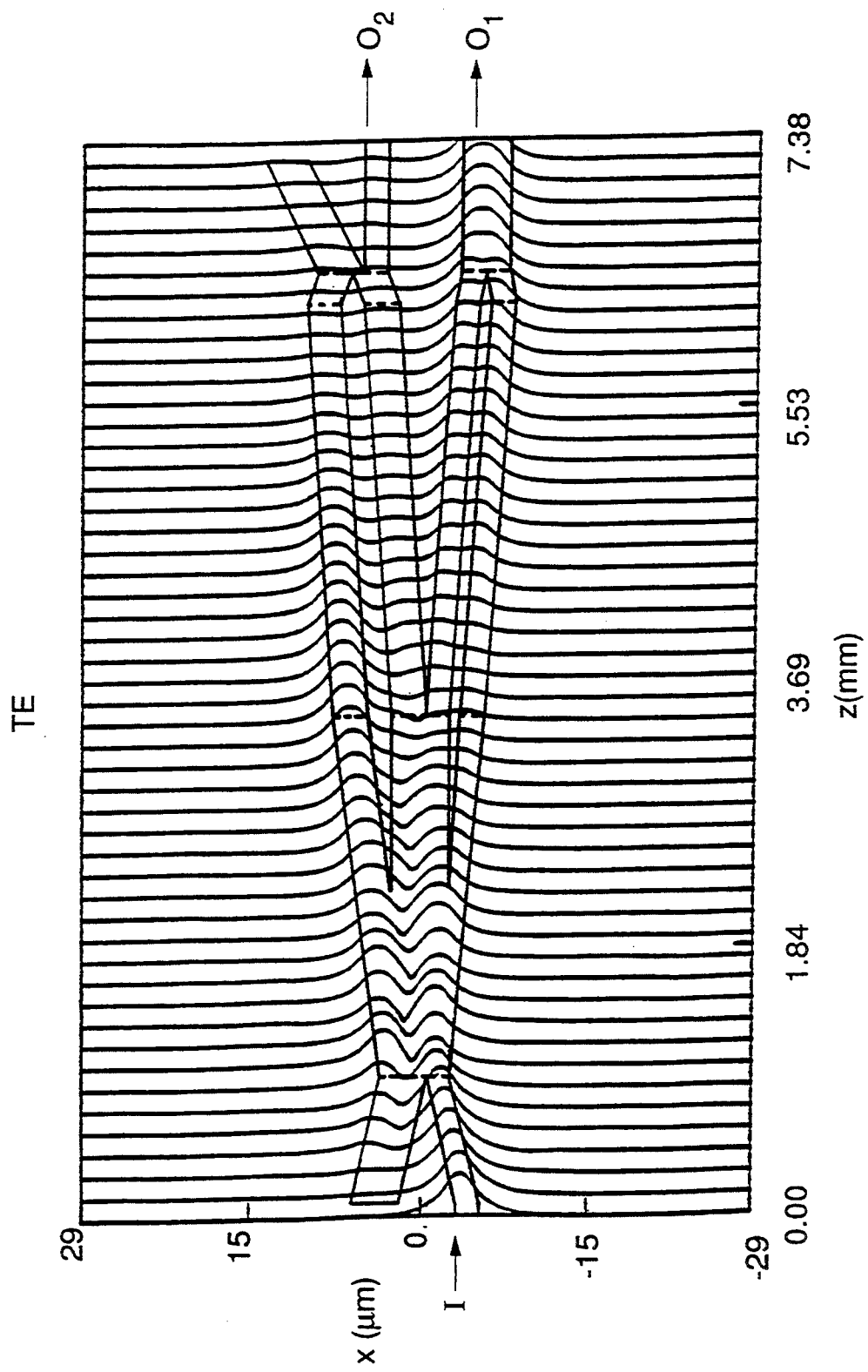

FIG. 6b depicts the course of propagation in the case where the optical signal (arrow I) entering section G is a signal which exclusively contains the TE polarization. Result: 96.6% of the TE signal exits according to the arrow O1 and 1.3% according to the arrow O2; loss: ≦0.1 dB and suppression: −19 dB.

Figure 6C:
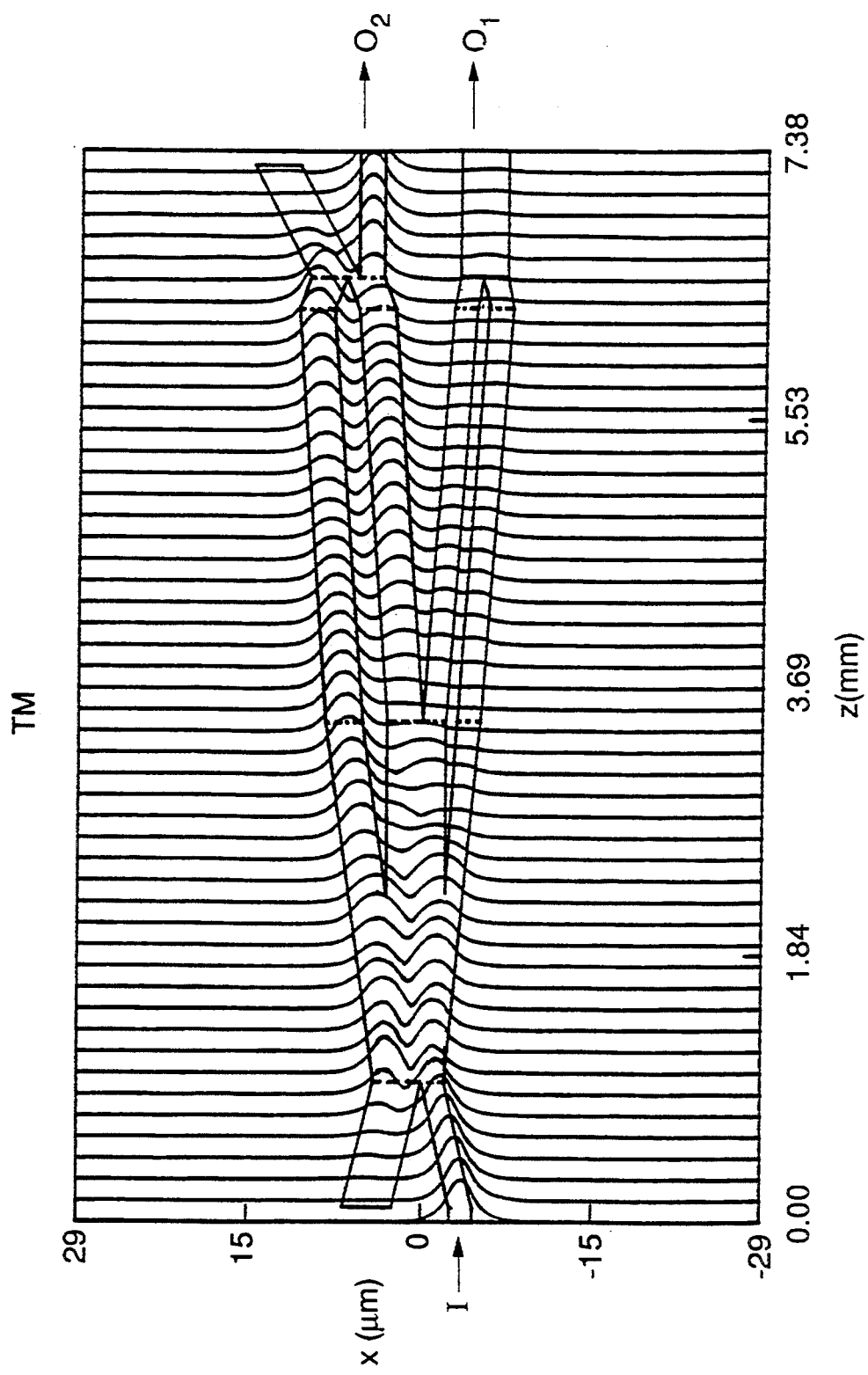

FIG. 6c depicts a similar course in the case where the incoming signal (arrow I) exclusively contains the TM polarization. Result: 96.0% of the TM signal exits according to the arrow O1 and 1.0% according to the arrow O2; loss: 0.13 dB and suppression: −20 dB.

In the polarization splitters described above, the constituent waveguiding sections have, on the grounds of the time reversal invariance principle, a reverse action for optical signals having an opposite propagation direction. The splitters therefore act, for signals in the opposite direction, as a polarization combiner or multiplexer or as a polarization filter. If signals having a pure polarization (i.e. a pure TE signal according to the arrow O1, and a pure TM signal according to the arrow O2) are input to the output guides (28, 29 in FIG. 2, FIG. 4a and FIG. 5a; 71 and 72 in FIG. 6a) opposite to the direction of the arrows O1 and O2, the combined signal emerges at the input guide (21 in FIG. 2, FIG. 4a and FIG. 5a; 61 in FIG. 6a) opposite to the direction of arrow I. From a signal having both polarization components (TE and TM), input to an output guide opposite to the arrow O1 or O2, the polarization component which does not match the output guide in question (i.e. TM for the output guide with arrow O1 and TE for that with arrow O2) will be filtered away, so that a pure TE or TM signal appears at the input guide.

I claim:

1. Integrated optical device for manipulating the polarization of light-wave signals, comprising
a substrate, and
an optical-waveguiding thin layer supported by the substrate and provided with
a first waveguiding section including a first channel-shaped waveguide,
a second waveguiding section including a second channel-shaped waveguide and a third channel-shaped waveguide, in which second section the second and third waveguides are optically decoupled and physically separated, and
an intermediary waveguiding section for an adiabatic coupling between the first and the second waveguiding sections, including an asymmetric Y branching device provided with two mutually diverging intermediary channel-shaped waveguides, coupled, respectively, with the second and the third waveguides of the second section, which intermediary waveguides have waveguide profiles having different propagation constants for each of the transverse polarization modes (TE, TM), the difference of the propagation constants of the two intermediary waveguides for the one polarization mode differing in sign from the difference of the propagation constants of the two intermediary waveguides for the other polarization mode, characterized in that
at least one of the two intermediary channel-shaped waveguides has a geometrical structure which is fragmented in the longitudinal direction, which intermediary waveguide is hereinafter called fragmented waveguide, and in that the intermediary section further comprises a first coupling section for an adiabatic coupling of the first channel-shaped waveguide of the first waveguiding section with the intermediary waveguides, and a second coupling section for the adiabatic coupling of the fragmented waveguide with the second waveguide of the second waveguiding section, the coupling sections at the coupling sides in question with the fragmented waveguide having a corresponding fragmented geometric structure.

2. Integrated optical device according to claim 1, characterized in that the two intermediary waveguides are fragmented waveguides, of which the one is bimodal and the other monomodal, in that the channel-shaped waveguides of the first and second waveguiding sections are monomodal, in that between the first channel-shaped waveguide and the first coupling section a first polarization-insensitive mode converter is incorporated for converting a zeroth-order guided mode into a first-order guided mode and vice versa, and in that between the second coupling section, by means of which the bimodal fragmented waveguide is coupled with one of the channel-shaped waveguides of the second waveguiding section, and one of the waveguides of the second waveguiding section a second polarization-insensitive mode converter is incorporated for converting a first-order guided mode into a zeroth-order guided mode and vice versa.

3. Integrated optical device according to claim 2, characterized in that the polarization-insensitive mode converters are asymmetric Y-junctions having a bimodal trunk and monomodal branching waveguiding channels having mutually different propagation constants, the branching channel having the lowest propagation constant being directly coupled with the monomodal guide in question of the first or the second waveguiding section.

4. Integrated optical device according to claim 1, characterized in that the fragmented waveguides and the coupling sections are of the ridge type, each of the fragmented waveguides comprising a ridge pattern having a number of ridges running in parallel, and each of the coupling sections comprising a ridge pattern having a single ridge which widens towards the coupling side with a fragmented waveguide and splits into a number of ridges which adiabatically adjoin the ridges of the fragmented waveguide in question.

5. Integrated optical device according to claim 4, characterized in that the ridge pattern of each of the fragmented waveguides comprises two ridges having a suitably chosen height, width and spacing.

6. Integrated optical device according to claim 2, characterized in that the fragmented waveguides and the coupling sections are of the ridge type, each of the fragmented waveguides comprising a ridge pattern having a number of ridges running in parallel, and each of the coupling sections comprising a ridge pattern having a single ridge which widens towards the coupling side with a fragmented waveguide and splits into a number of ridges which adiabatically adjoin the ridges of the fragmented waveguide in question.

7. Integrated optical device according to claim 6, characterized in that the ridge pattern of each of the fragmented waveguides comprises two ridges having a suitably chosen height, width and spacing.

8. Integrated optical device according to claim 3, characterized in that the fragmented waveguides and the coupling sections are of the ridge type, each of the fragmented waveguides comprising a ridge pattern having a number of ridges running in parallel, and each of the coupling sections comprising a ridge pattern having a single ridge which widens towards the coupling side with a fragmented waveguide and splits into a number of ridges which adiabatically adjoin the ridges of the fragmented waveguide in question.

9. Integrated optical device according to claim 8, characterized in that the ridge pattern of each of the fragmented waveguides comprises two ridges having a suitably chosen height, width and spacing.

* * * * *

UNITED STATES PATENT AND TRADEMARK OFFICE
CERTIFICATE OF CORRECTION

PATENT NO. : 5,418,867
DATED : May 23, 1995
INVENTOR(S) : VAN DER TOL

It is certified that error appears in the above-indentified patent and that said Letters Patent is hereby corrected as shown below:

Title Page, under Section [75] INVENTOR, change "Maria Van Der Tol" to

--Johannes J.G.M. Van Der Tol--.

Signed and Sealed this

Twenty-seventh Day of August, 1996

Attest:

BRUCE LEHMAN

*Attesting Officer*     *Commissioner of Patents and Trademarks*